(12) United States Patent
Mundhenk et al.

(10) Patent No.: US 10,002,430 B1
(45) Date of Patent: Jun. 19, 2018

(54) TRAINING SYSTEM FOR INFIELD TRAINING OF A VISION-BASED OBJECT DETECTOR

(71) Applicant: HRL Laboratories, LLC, Malibu, CA (US)

(72) Inventors: Terrell N. Mundhenk, Dublin, CA (US); A. Arturo Flores, San Diego, CA (US); Howard Neely, III, Santa Monica, CA (US); Michael J. Daily, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 29 days.

(21) Appl. No.: 15/141,416

(22) Filed: Apr. 28, 2016

Related U.S. Application Data

(63) Continuation-in-part of application No. 14/292,416, filed on May 30, 2014, now Pat. No. 9,378,420.

(60) Provisional application No. 61/830,896, filed on Jun. 4, 2013, provisional application No. 62/153,706, filed on Apr. 28, 2015, provisional application No. 62/153,993, filed on Apr. 28, 2015.

(51) Int. Cl.
*G06T 7/00* (2017.01)
*G06N 99/00* (2010.01)

(52) U.S. Cl.
CPC ......... *G06T 7/0042* (2013.01); *G06N 99/005* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 6,263,088 B1 | 7/2001 | Crabtree | |
| 7,272,593 B1 | 9/2007 | Castelli et al. | |
| 7,454,388 B2 | 11/2008 | Thaler | |
| 2004/0111453 A1 | 6/2004 | Harris | |
| 2006/0222239 A1 | 10/2006 | Bargeron | |
| 2007/0127819 A1* | 6/2007 | Lee ..................... | G06F 17/3079 382/190 |

(Continued)

FOREIGN PATENT DOCUMENTS

WO   WO 2010-021527   2/2010

OTHER PUBLICATIONS

Product Image Classification Based on Local Features and SVM Classifier. Jia et al. Mar. 2012.*

(Continued)

*Primary Examiner* — Delomia L Gilliard
(74) *Attorney, Agent, or Firm* — Tope-McKay & Associates

(57) ABSTRACT

Described is a training system for training a vision-based object detector. The system is configured to run an object detector on an image of a cleared scene to detect objects in the cleared scene. The object detector includes a support vector machine (SVM) or similar classifier with a feature model to generate an SVM score for object features and a spatial bias threshold to generate augmented object scores. The system designated detected objects in the cleared scene as false detections and, based on that, updates at least one of the feature model and spatial bias threshold to designate the false detections as background. The updated feature model or updated spatial bias threshold are then stored for use in object detection.

25 Claims, 9 Drawing Sheets

(56) References Cited

U.S. PATENT DOCUMENTS

| | | |
|---|---|---|
| 2009/0208061 A1 | 8/2009 | Matsumoto et al. |
| 2010/0026721 A1 | 2/2010 | Park et al. |
| 2012/0294476 A1 | 11/2012 | Wei |
| 2013/0155229 A1 | 6/2013 | Thornton |
| 2013/0266177 A1 | 10/2013 | Sanches |
| 2013/0279800 A1 | 10/2013 | Ranganathan |
| 2014/0185925 A1* | 7/2014 | Datta .................... G06K 9/6256 382/159 |
| 2014/0254923 A1 | 9/2014 | Vidal Calleja |
| 2016/0307069 A1* | 10/2016 | Wu ....................... G06K 9/6255 |

OTHER PUBLICATIONS

Bosch, A., et al., "Image classification using random forests and ferns," Paper presented at the ICCV, 2007.

Csurka, G., et al., Christopher R. Dance, Lixin Fan, Jutta Willamowski, Cedric Bray, Paper presented at the ECCV, 2004.

Itti, L., et al., "A model of saliency-based visual attention for rapid scene analysis," IEEE Transactions on Pattern Analysis and Machine Intelligence, 20(11), 1254-1259, 1998.

Lazebnik, S., et al., "Beyond bags of features: spatial pyramid matching for recognizing natural scene categories," Paper presented at the CVPR, 2006.

Singer, Y., et al., "Pegasos: Primal estimated sub-gradient solver for SVM," Paper presented at the ICML, 2007.

Vedaldi, A., "VLFeat: an open and portable library of computer vision algorithms," retrieved from http://vlfeat.org/, 2008.

International Search Report and the Written Opinion of the International Searching Authority for PCT/US2014/040357; dated Oct. 21, 2014.

Shijie Jia, et al., "Product Image Classification Based on Local Features and SVM Classifier," Journal of Convergence Information Technology(JCIT), vol. 7, No. 5, Mar. 2012, pp. 1-9.

Notification Concerning Transmittal of International Preliminary Report on Patentablity for PCT/US2014/040357; dated Dec. 17, 2015.

International Preliminary Report on Patentablity for PCT/US2014/040357; dated Dec. 17, 2015.

Office Action 1 for U.S. Appl. No. 14/292,416, dated Oct. 16, 2015.

Response to Office Action 1 for U.S. Appl. No. 14/292,416, dated Jan. 19, 2016.

Notice of Allowance for U.S. Appl. No. 14/292,416, dated Mar. 4, 2016.

Shijie Jia, et al., "Product Image Classification Based on Local Features and SVM Classifier," Mar. 28, 2012.

Bosch, A., Zisserman, A., and Munoz, X. (2007). Image classification using random forests and ferns, Paper presented at the ICCV. Conference: IEEE 11th International Conference on Computer Vision, ICCV 2007, Rio de Janeiro, Brazil, Oct. 14-20, 2007, pp. 1-8.

Javed, O., Ali, S., and Shah, M. (Jun. 2005). Online detection and classification of moving objects using progressively improving detectors. Paper presented at the CVPR. In Computer Vision and Pattern Recognition, 2005. CVPR 2005. IEEE Computer Society Conference on, vol. 1, pp. 696-701. IEEE, 2005.

Liao, W.-H. (Nov. 2011). Pedestrian Detection Using Covariance Descriptor and On-line Learning. Paper presented at the Technologies and Applications of Artificial intelligence, pp. 179-482.

Singer, Y., and Srebro. N. (2007). Pegasos: Primal estimated subgradient solver for SVM. Paper ICML. Appearing in Proceedings of the 24 th International Conference on Machine Learning, Corvallis, OR, 2007, pp. 1-8.

Vedaldi, A., and Fulkerson, B. (2008). VLFeat: An Open and Portable Library of Computer Vision Algorithms, Retrieved from http ://www.vlfeat.org/. Downloaded May 24, 2016.

Lazebnik, S., Schmid, C., and Ponce. J. in "Beyond Bags of Features: Spatial Pyramid Matching for Recognizing Natural Scene Categories" presented at the CVPR (2006). In Computer Vision and Pattern Recognition, 2006 IEEE Computer Society Conference on, vol. 2, pp. 2169-2178, IEEE, 2006.

\* cited by examiner

TRAINING SYSTEM FOR INFIELD TRAINING OF A VISION-BASED OBJECT DETECTOR

CROSS-REFERENCE TO RELATED APPLICATIONS

This is a Continuation-in-Part application of U.S. Ser. No. 14/292,416, filed on May 30, 2014, entitled, "System for Detecting an Object of Interest in a Scene," which is a non-provisional application of U.S. Provisional Application No. 61/830,896, filed on Jun. 4, 2013 the entirety of which are incorporated herein by reference.

This is ALSO a non-provisional application of U.S. Provisional Application No. 62/153,706, filed on Apr. 28, 2015.

This is ALSO a non-provisional application of U.S. Provisional Application No. 62/153,993, filed on Apr. 28, 2015.

GOVERNMENT RIGHTS

This invention was made with government support under U.S. Government REF ASPS Program, Contract Number 154318. The government has certain rights in the invention.

FIELD OF INVENTION

The present invention generally relates to an object detection system and, more particularly, to a training system for training an object detector to be adapted to its location.

BACKGROUND OF INVENTION

Object detectors are typically used to detect objects in a scene. A problem arises, however, when the relevant object detector is employed in a new environment. To address the new and changing scenery as presented in a new environment, object detectors of the prior art require typically require expert trainers or training sessions that are costly and can be time prohibitive. In some scenarios (such as a changing and mobile conflict), utilizing expert trainers may simply not be possible. Thus, a need exists for an infield training system.

The prior an for feature-based infield training is sparse. For example, there are a few online training systems available (see the List of Incorporated Literature References, Reference Nos. 2 and 3); however, they are not aimed at an end user environment. Alternatively, a few references discuss setting a region of interest with a set suppression biases. For instance, U.S. Pat. No. 7,454,388 (Literature Reference No. 6) describes using a neural network which is trained via reinforcement. However, it is most likely a slow training process and there is no mention of ease of use. Further, U.S. Pat. No. 7,272,593 (Literature Reference No. 7) requires user feedback which is time consuming and prohibitive in some scenarios. Importantly, none of the aforementioned references are suited for infield use by a non-technical person for pedestrian (object) detection.

Thus, a continuing need exists for a system that does not require user feedback and for training an object detector to be adapted to its location.

SUMMARY OF INVENTION

Described is a vision-based object detector and method and system for training such a detector. In some aspects, the system comprises one or more processors and a memory. The memory having executable instructions encoded thereon, such that upon execution of the instructions, the one or more processors perform several operations, including running an object detector on an image of a cleared scene to detect objects in the cleared scene, the object detector having a detection classifier (e.g., support vector machine (SVM)) with a feature model to generate a detection score (e.g., SVM score) for object features and a spatial bias threshold to generate augmented object scores; designating detected objects in the cleared scene as false detections; and updating at least one of the feature model and spatial bias threshold to designate the false detections as background; and storing the updated feature model or updated spatial bias threshold in the vision-based object detector.

In another aspect, updating the spatial bias threshold further comprises operations of loading an old bias file into the object detector; combining the old bias file with a new bias file by concatenating the old bias file and the new bias file to generate a learned bias file; and storing the learned bias file.

In yet another aspect, updating the feature model further comprises operations of obtaining feature descriptors from all detected objects designated as false detections; running the feature descriptors through the detection classifier in a randomized order with particular training parameters to generate detection scores; augmenting weights of the feature model in the detection classifier until all detection scores provided are above a predetermined threshold, indicating no false detections; and saving augmented weights in the detection classifier as the updated feature model.

Additionally, each detection score is associated with a score rectangle in an image of a scene and wherein the learned bias file includes bias rectangles that inhibit false detections of objects within the bias rectangle.

In yet another aspect, the system further performs operations of determining (for all detection classification scores above a predetermined threshold) if a corresponding score rectangle overlaps with a bias rectangle. If a score rectangle does not overlap with a bias rectangle, then obtaining a next bias rectangle and score rectangle and determining overlap. If a score rectangle does overlap with a bias rectangle, then subtracting the bias rectangle from the score rectangle. The system also generates an augmented object score, the augmented object score reflecting a likelihood that a target object is in the scene.

In yet another aspect, the detection classifier is support vector machine (SVM) classifier and the detection score is an SVM score.

Finally and as noted above, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
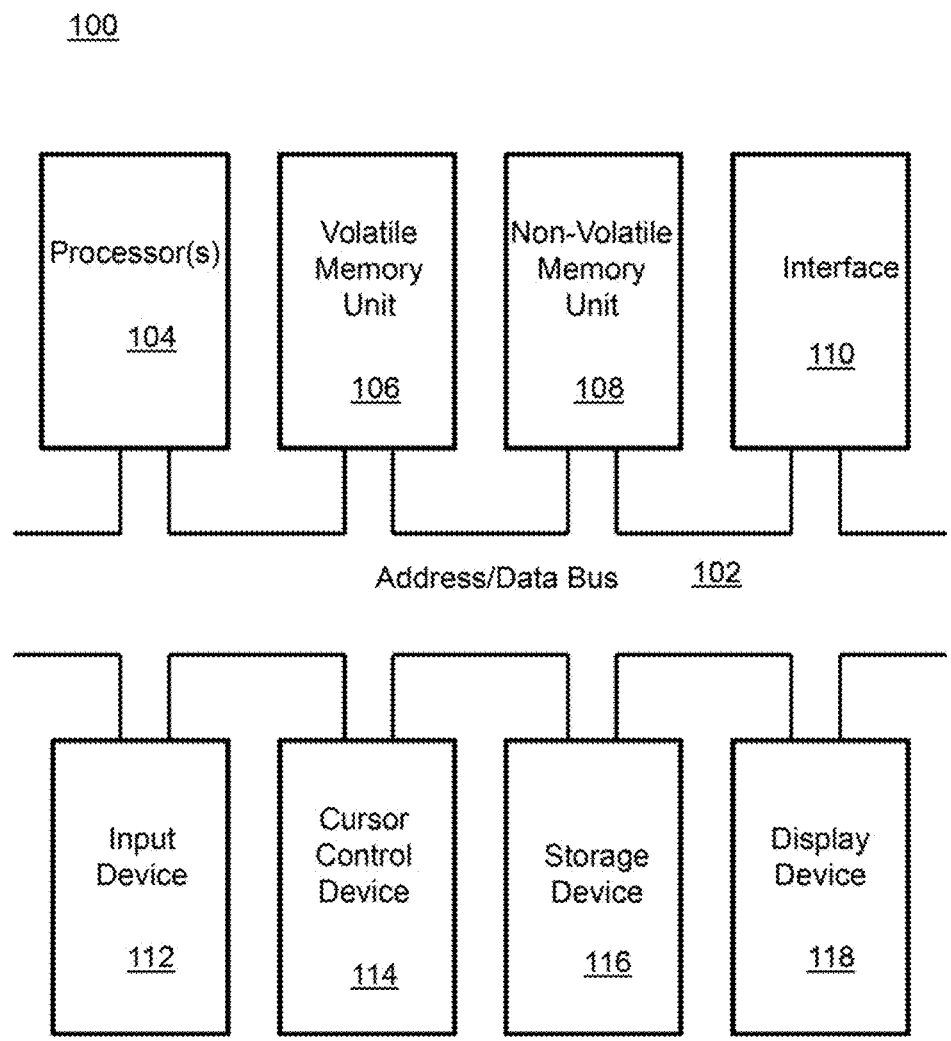
FIG. 1 is a block diagram depicting the components of a system for infield training of an object detector according to the principles of the present invention.

The present invention generally relates to an object detection system and, more particularly, to a training system for training an object detector to be adapted to its location. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of incorporated literature references is provided. Next, a description of the various principal aspects of the present invention is provided. Subsequently, an introduction provides the reader with a general understanding of the present invention. Next, specific details of the present invention are provided to give an understanding of the specific aspects. Finally, experimental results based on the implementation of the present invention are discussed.

(1) List of Incorporated Literature References

The following references are cited throughout this application. For clarity and convenience, the references are listed herein as a central resource for the reader. The following references are hereby incorporated by reference as though fully set forth herein. The references are cited in the application by referring to the corresponding literature reference number, as follows:

1. Bosch, A., Zisserman, A., and Munoz, X. (2007). Image classification using random forests and ferns. Paper presented at the ICCV.
2. Javed, O., Ali, S., and Shah, M. (2005, June). Online detection and classification of moving objects using progressively improving detectors. Paper presented at the CVPR.
3. Liao, W.-H. (2011, November). Pedestrian Detection Using Covariance Descriptor and On-line Learning. Paper presented at the Technologies and Applications of Artificial Intelligence.
4. Singer, Y., and Srebro, N. (2007). Pegasos: Primal estimated sub-gradient solver for SVM. Paper presented at the ICML.
5. Vedaldi, A., and Fulkerson, B. (2008). VLFeat: An Open and Portable Library of Computer Vision Algorithms, Retrieved from http://www.vlfeat.org/.
6. U.S. Pat. No. 7,454,388, filed on May 8, 2006, entitled, "Device for the autonomous bootstrapping of useful information."
7. U.S. Pat. No. 7,272,593, filed on Jan. 26, 1999, entitled, "Method and apparatus for similarity retrieval from iterative refinement."
8. Lazebnik, S., Schmid, C., and Ponce, J. in "Beyond Bags of Features: Spatial Pyramid Matching for Recognizing Natural Scene Categories" presented at the CVPR (2006).

(2) Principal Aspects

The present invention has three "principal" aspects. The first is a training system for training an object detector to be adapted to its location. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
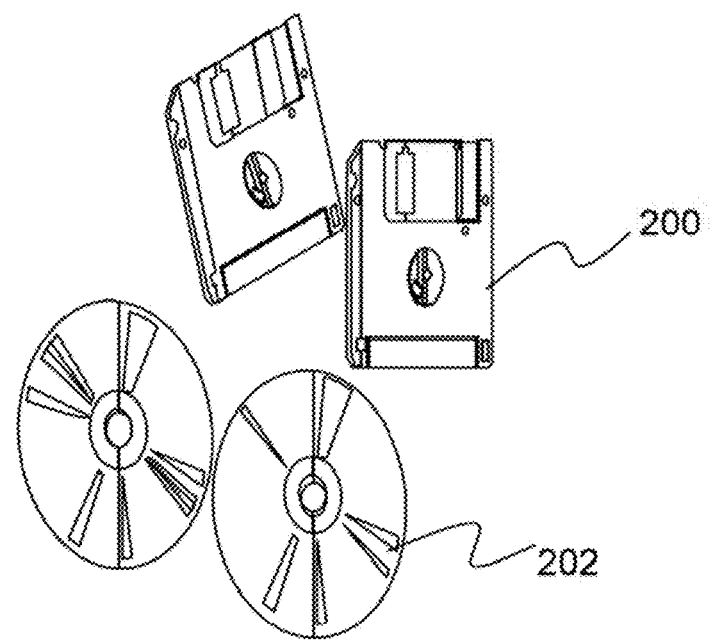
FIG. 2 is an illustration of a computer program product embodying an aspect of the present invention.

An illustrative diagram of a computer program product (i.e., storage device) embodying an aspect of the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) Introduction

Described is a training system for training an object detection system to be adapted to its location. The invention allows a visual object detection/identification system (such as a pedestrian detector/identifier) to be re-trained infield by a non-technical person. Thus, the present invention can be implemented to operate with and improve any suitable existing object identification/detection system, a non-limiting example of which is described in U.S. patent application Ser. No. 14/292,416, filed on May 30, 2014, entitled, "System for Detecting an Object of Interest in a Scene." For convenience purposes and clarity, the object identification/detection system will be referred to herein generally as the "Object Detector".

As noted above, the present invention can be implemented with an Object Detector to allow for infield adjustment of the Object Detector. A problem with some existing object detection systems is that they suffer from false positives as a result of objects that the system was never trained on. Thus, this invention allows exposure to objects which the underlying Object Detector was not previously trained on. Emphasis has been placed on an ease of use paradigm so that the Object Detector can be easily tuned (infield) to whatever environment it is deployed to.

In operation, the end user simply ensures that the target object is not in the field-of-view of the camera system (as attached to or otherwise incorporated into the object detector) and clicks train. This will either update the object appearance model itself or will create spatial biases. The new model or biases are then stored and are recalled when the Object Detector is run again. Training can be done multiple times and spatial bias training can be run concurrently with the object model retraining.

Automatic infield retraining of pedestrian detection is somewhat uncommon due to the complexity of updating a model and the fact that most models have difficulty training an update with false positives samples only. Additionally, the system according to the principles of the present invention works very fast. For example, what is referred to as "one-click" retaining takes less than 1/10 of a second. The speed of feature-based training might not be possible with common support vector or boosting based methods.

The invention described herein solves an old generalization and context problem by allowing an Object Detector to be adapted to its location. Thus, a non-technical person can click train and the Object Detector learns new general features related to its new environment. This cuts down on false positive identification and thus false alarms without significant effect on the devices ability to properly detect targets. This invention does not affect false negatives. However, since the appearance of the target is constrained relative to the set of all objects which are not the target, it is easier to present a high variety set of training samples for the target object. As an example, the training system can represent the appearance of pedestrians more easily with 40,000 training samples than it can for the set of all other things which are not a pedestrian. The invention described herein picks up the slack for this deficiency.

As noted above, the training system described herein can be implemented with any system that is deployed infield for object or pedestrian detection. Example implementations include security, factory automation and surveillance, driverless vehicles, etc. Thus, the invention is designed to improve a device (Object Detector) that is designed to watch for people or vehicles which should not be in a particular area. Specific details are provided in further detail below.

(4) Specific Details of the Invention (4.1) Overview

The training system is designed to enable end users without in-depth technical training to adapt (retrain) an object detection device (i.e., Object Detector) to its specific environment. The basic idea is the following. Many object identification devices are imperfect. For instance, devices which are designed to detect people by visual identification will mistake objects such as trees for people. This is in part due to failure to account for the way certain objects look during the initial development training. Thus, a tree in the field may look unlike any tree used in training. Additionally, some objects look very similar to people. Human beings are able to extract context to determine validity of an object which looks human like. For instance, an outcropping of rocks in the shape of a person can be discounted easily by a human observer because they understand that it is composed of rocks on a rocky cliff. Most object identification devices lack context awareness. So this creates another difficult to avoid failure.

A way to deal with these problems is to allow operator intervention to quickly embed contextual information into the detection system. This can be done in a few different ways. One way is to tell the device that an object at some location is not what it thinks it is. So for instance, an operator might inhibit detection of the rocky outcropping by where it appears to be. Thus, detection response are suppressed at a specific location in the devices visual field. Another way of helping the device is to augment its training by adding a description of a problematic object to its knowledge. This helps particularly if the device is false detecting an object it might have never been trained about. So for instance, one might change the devices model of what a person looks like to exclude the appearance of a tree it keeps mistaking for a human.

In addition to the function of the invention being able to augment the operation of the detection device, the invention must be operable by a lay person and perform the task quickly. One way to do this is with one-click training. The idea here is that the operator is most concerned about false positives. That is, the operator is most concerned about labeling an object as a person which is not. The approach is to simply make sure no person is standing in the field-of-view. Then the operator clicks a "train" button (or the like). Any object in the field-of-view which yields false positives is visually captured and used to quickly retrain the device in field. The end result is that any specific object in the scene giving a false positive no longer does so. The end user only needs to make sure that no person is standing in the field-of-view and then clicks retrain (if retraining a person/pedestrian detector). Thus, no technical expertise is required.

(4.2) Object Detector

As noted above, the invention described herein is designed to be used with an object detection system (Object Detector), such as that described in U.S. patent application Ser. No. 14/292,416 and of which is incorporated by reference as though fully set forth herein. For clarity, the Object Detector will be discussed briefly here as well. To prevent confusion, the two devices will be referred to as the Object Detector and Training System. The latter here (i.e., Training System) is the subject of this Specification while the former is the device this invention is designed to work on or with. Also, the training system has two modes of training. One is a spatial bias training and the other is a feature model (also:

appearance-based or feature-based) training. These will be described in further detail below.

The Object Detector is designed to be a part of a stationary security camera setup. The camera itself can move on its platform, but the platform itself does not move. An example of a stationary camera platform would be something like a tripod or any other suitable platform. The Object Detector receives images from the camera and processes the images to look for specific objects, such as people or cars. The end result of processing by the detection device is a set of regions (e.g., rectangular regions) in which an object is thought to be. An operator can be notified based on the results.

Figure 3:
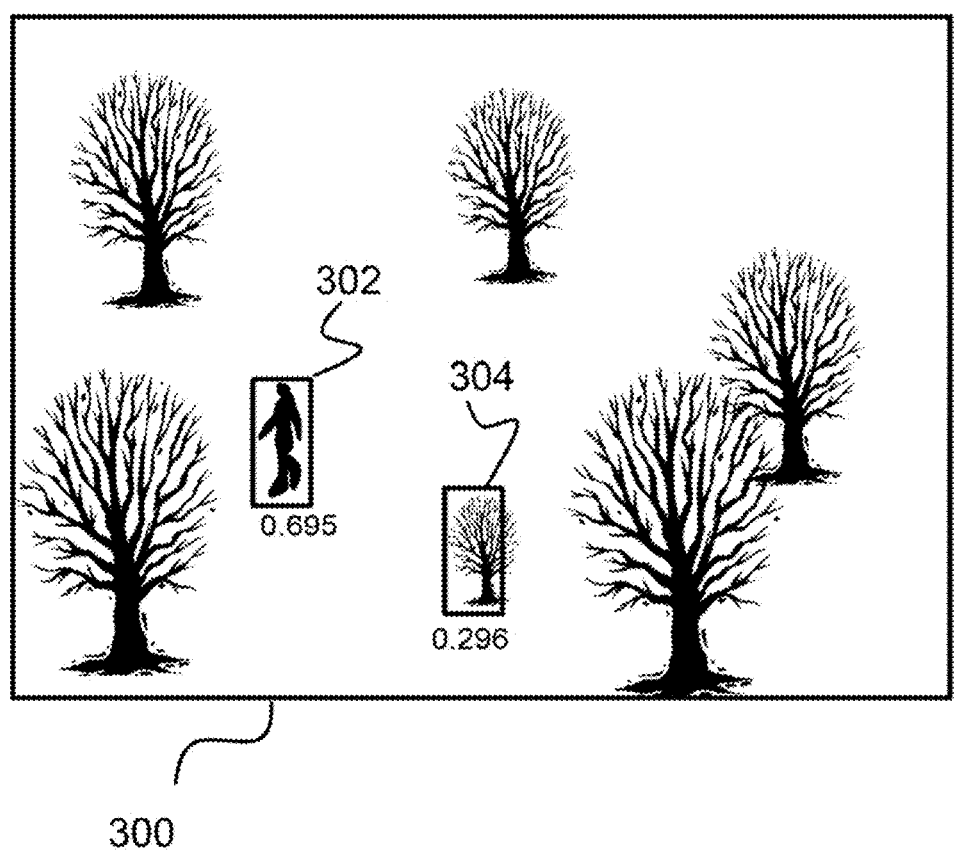
FIG. 3 is an example of a true detection (left) and a false positive (right) as generated by an Object Detector.

FIG. 3, for example, illustrates an example of an image 300 with rectangular detection regions. As shown, on the left is a true detection 302 while the right rectangle shows a false positive 304. The false positive 304 will continue to be detected by the Object Detector on consecutive frames. Thus, it is ideal to suppress the score returned spatially in the rectangle or to learn how that patch of plants looks so that the Object Detector no longer considers it human looking.

An alarm device or graphical user interface then receives these sets of scores and decides if it should alert a human operator that a suspect object has been detected. So for instance, this might tell the operator that a human is walking in an area where no person should be, such as a border region, demilitarized zone or other places denoted as off limits. This makes the Object Detector an extremely sophisticated alarm device.

Figure 4:
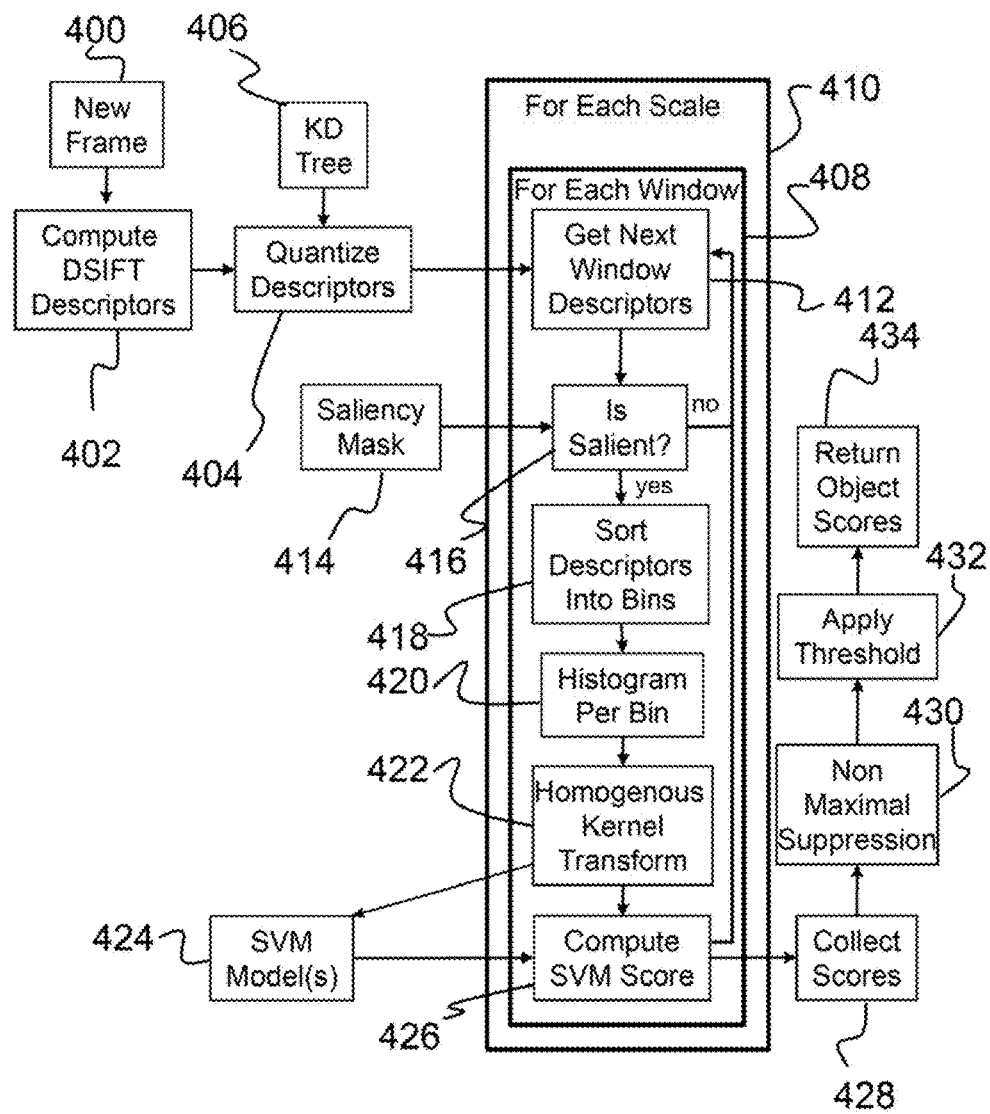
FIG. 4 is a block diagram illustrating a process flow of an Object Detector system according to the principles of the present invention.

FIG. 4, for example, depicts a block diagram of a non-limiting example of an Object Detector that can be augmented with the training system of the present application. Notably, the SVM Model 424 block is augmented by the feature-based training of the present invention while the Apply Threshold 432 block is augmented by the spatial bias training.

For further understanding and as shown in FIG. 4, the Object Detector 401 receives a new image frame 400 and extracts features over the entire image. The features being extracted are referred to as dense Scale Invariant Feature Transform (SIFT) descriptors (DSIFT) 402. The DSIFT descriptors 402 are derived from the gradients in the image 400 and give an idea of what the lines are like at every location in the image. Next, the DSIFT descriptors are quantized 404 using any suitable quantization technique, a non-limiting example of which was described by Bosch et al. in Literature Reference No. 1, which is hereby incorporated by reference as though fully set forth herein. The quantization 404 is a process whereby each descriptor is classified as being like another descriptor the Object Detector was trained on. Most plainly, the Object Detector 401 essentially identifies what each DSIFT descriptor looks like. This is done by using a KD-Tree query 406. The KD-Tree contains a dictionary of thousands of previously learned features. A KD-Tree query 406 looks through this dictionary to find the learned exemplar the particular descriptor is most like. This process is repeated for all the DSIFT descriptors 402 extracted from the image 400. The new quantized features are known as PHOW features (Pyramid Histogram Of visual Words).

Once all the PHOW features have been computed over the entire image, the PHOW features are then reviewed to see if they describe the target object. This is done by using a sliding window. The window moves over the image and all the PHOW features from the part of the image which falls inside the windowed area are gathered together and analyzed. While the Object Detector 401 can scan the entire scene using a sliding window, it is desirable to use a selective window to only inspect regions of the image which are most salient to increase speed (as discussed in further detail below). Since the classifier is trained on objects which are approximately the same size as the window, the sliding window protocol is executed with different scaled windows in order to detect targets at many different sizes. A sliding window is a region of interest from which we take features. For instance, a sliding window might be a region 128×64 pixels in size. This is just big enough in many images to contain a pedestrian. Windows of different sizes are used since the best results are obtained when the window is the same size as the pedestrian observed in the image.

During the sliding window protocol, within each window 408 (for each scale 410), the Object Detector 401 gathers statistics about the PHOW features and attempts to classify the object in the window based on those statistics. In doing so, the Object Detector 401 goes through each descriptor, as follows. In each window 408, the Object Detector 401 gathers a descriptor 412 (moving sequentially to obtain descriptors). In other words, each window 408 gathers all the descriptors that are within that window. The descriptors inside a window are gathered at once. The window 408 itself moves sequentially. Each time the window 408 moves, it gathers the features in that location.

An attention component 416 determines if the descriptors 412 are sufficiently salient. In doing so, a saliency mask 414 is used to determine if the descriptor 412 is salient enough for further processing. The saliency mask 414 is a mask that masks out regions of the image that are not sufficiently salient per the particular mask. If the descriptor 412 is not salient enough, then the Object Detector 401 moves on to the next descriptor and repeats the saliency determination process. If the descriptor 412 is salient enough, then the process continues as described below.

The window is subdivided into a set of bins with the descriptors being sorted 418 into the bins as follows. As a non-limiting example, the window is subdivided in a 3×3 set of bins, similar to that as described by Lazebnik et al. in Literature Reference No. 8, which is hereby incorporated by reference as though fully set forth herein. Inside each bin, a histogram 420 is compiled of the PHOW features. Doing this over all the bins creates 9 independent histograms. The histograms are a count of how many of each type of PHOW features are found in each bin. The histogram is then transformed by a Chi-Square homogeneous kernel transform 422. The Chi-Square homogenous kernel transform 422 is commonly understood by those skilled in the art and is also described as VLFeat and can be found via the open source library at www.vlfeat.org/overview/svm.html, taken on May 15, 2014, and which is hereby incorporated by reference as though fully set forth herein.

Once the histograms have been transformed, all nine histograms are fed into a support vector machine (SVM) classifier 424 to compute an SVM score 426. The SVM classifier is any suitable SVM classifier, a non-limiting example of which includes the PEGASOS method for SVM, as described by Singer et al. in Literature Reference No. 4, which is hereby incorporated by reference as though fully set forth herein.

When the transformation is combined with a support vector machine (SVM) classifier, it has the effect of classifying histograms radially but with a flexible radius size. That is, the SVM classifies the collection of histogrammed features based on which object they most resemble. Further, any classifier that returns a score describing the similarity of histogrammed features to the object they most resemble can also be used in place of the SVM classifier. Thus, it should be understood that the SVM classifier is provided as a non-limiting example of a suitable classifier; however, any type of classifier that returns a detection score may be employed in lieu of the SVM classiier using the system and process described herein.

The SVM 424 returns an SVM score 426 for how much an object is like a target object which it has been trained to recognize. If the score is negative, then the object in the window is unlike the trained object. The Object Detector 401 uses a tangential sigmoid (see www.en.wikipedia.org/wiki/Sigmoid_function or www.mathworks.com/help/nnet/ref/tansig.html) to squash the SVM 424 output score 426 so that it ranges from −1.0 to 1.0. The tangential sigmoid is also known to those skilled in the art as a hyperbolic tangent sigmoid. Once the SVM score is squashed, the scores are collected 428 together for all the windows analyzed by the sliding window routine. Since the sliding window slides over thousands of locations in each image, the list of scores (collected scores 428) needs to be reduced to just a few good possible detections. The list of scores is reduced using Non-Maximal Suppression (NMS) 430. Most simply, NMS 430 eliminates any score from a window which overlaps another window with a higher score. So, many low scoring windows are eliminated by the fact that there is a much better scoring window very close to it in the scene. Additionally, thresholding 432 is applied such that scores below a predetermined threshold are also eliminated, resulting in the object scores 434 being provided for further processing. In one non-limiting example, the threshold can be set to zero since any score below zero indicates that the SVM 424 will determine that the object in the window is not the target object. The Object Detector 401 adds optimization to the NMS by placing scores into bins which reduces the number of scored windows which need to be compared.

Thus and as noted above, the type of features used are known as DSIFT features. DSIFT features provide information about the way lines appear in images. The statistics of the appearance of these lines is used to tell what kind of object is being looked at by the device. The DSIFT features are then classified by appearance. The Object Detector 401 then moves a sliding window over the input image. Within the window, features are collected and matched against the appearance model of the desired object. Thus, Object Detector 401 takes features out of a windowed area in the image, classifies the features for what kind of object it should be and then moves the window over and repeats this process over and over until it has moved the window over the entirety of the image (similar to convolution). Each place the window stops gets a score from the identification attempt. This means the operator is provided a bunch of scores indicating the likelihood that some object in the windowed area is the sought after object (e.g., pedestrian, etc.). The score itself ranges from −1.0 to 1.0. If a windowed area has a score such as 1.0, then the Object Detector 401 is extremely confident that the window contains the object it wants to find. A score like −1.0 denotes that the Object Detector 401 is highly confident that the window does not contain the object it is searching for. Thus, the score tells the operator the confidence of detection. A very low score around 0.0 indicates that the Object Detector 401 finds the windowed region ambiguous.

To determine if something looks like an object such as a person, the Object Detector 401 will compare the features in the window to an already learned model of weights. Assume that there exists a constant sized n set of features F with each ith feature denoted as $f_i$ in a windowed region. Also, assume an equal sized set of learned weights W denoted as $w_i$ and scalar bias b. The SVM model 424 (e.g., "PEGASOS", by Singer et al.) will compute two scores. One is the score for the object resembling the target object. The other score is for the object resembling background. The training system takes the max of the two and applies a sign based on which one of the two score components was maximum. Thus, if the background model component produced the largest score, the score is multiplied by −1 so that the score indicates the Object Detector 401 believes that the detection is not the target object type that is being sought (e.g., pedestrian).

To determine the score in a window at location (u,v) for objects of type 0 and 1, the training system computes:

$$S(u,v)=\text{sign}(obj)\cdot\tan h[\max(b^0+\Sigma_{i=1}^n f_i(u,v)\cdot w_i^0, b^1+\Sigma_{i=1}^n f_i(u,v)\cdot w_i^1)] \quad (1)$$

It should be noted that for purposes of this description, it is not critical what the input features are. What is important is how each window and thus each object is scored. As such, if an operator changes any one of the given weights, the operator can affect the score outcome. Thus, one way to train the device in field is to augment the set of weights. This is referred to as Feature-Based training. Note that the same set of weights is used at each window. As such, if an operator changes the weights, it changes how the device scores objects at all locations in the image. Alternatively, the training system can train by directly suppressing the weights. As an example, if a window at location (3,4) gives an erroneous score e(3,4) then the training system can just subtract that error out. This is referred to as Spatial-RBias training. These two types of training can be carried out at the same time or separately. The training provides a new way of scoring, as follows:

$$S(u,v)=\text{sign}(obj)\cdot\tan h[\max(b^0+\Sigma_{i=1}^n f_i(u,v)\cdot \hat{w}_i^0, b^1+\Sigma_{i=1}^n f_i(u,v)\cdot \hat{w}_i^1)]-e(u,v) \quad (2)$$

Here, e(u,v) is a learned error compensation for a specific location in the image while $\hat{w}_i$ is an updated set of weights from retraining the SVM model 424. The following sections describe how to derive these components.

Figure 5:
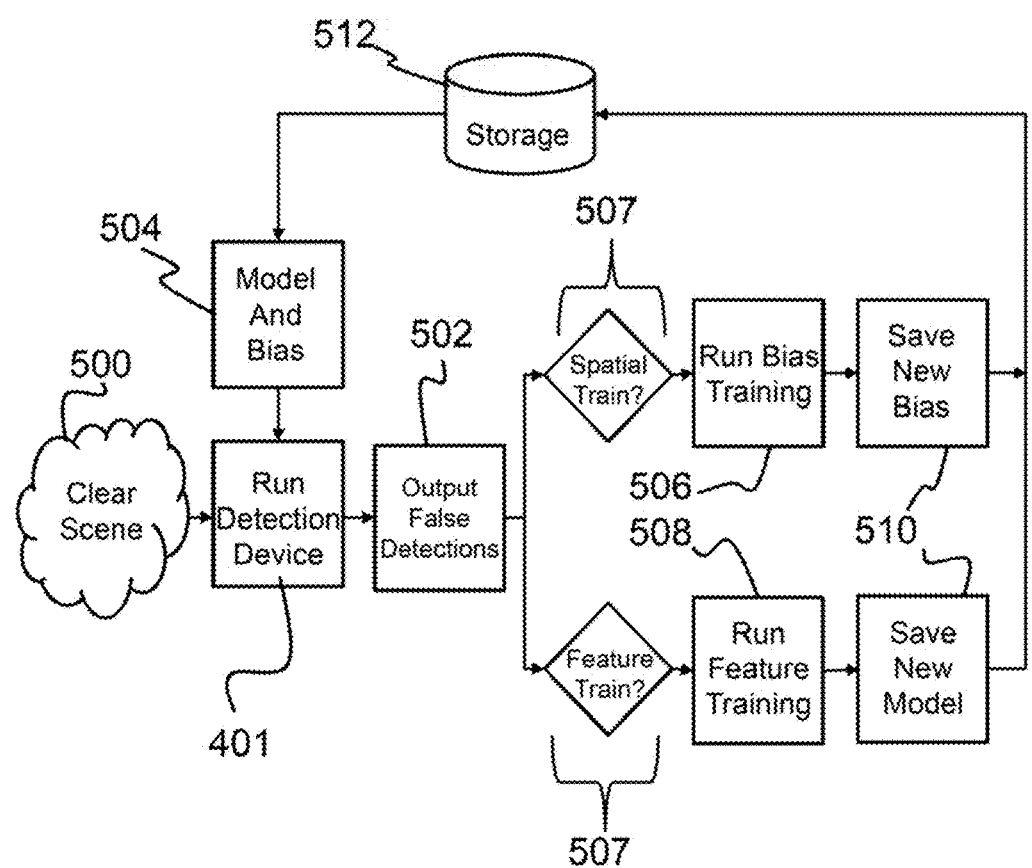
FIG. 5 is a block diagram illustrating a training process according to the principles of the present invention.

FIG. 5, for example, illustrates a process flow of the combined Spatial-Bias and Feature-Based infield training protocol according to the principles of the present invention. As a brief overview, a key principle is to clear 500 the scene and then click train. In other words, the scene is cleared of anything that an operator is seeking to detect. For example, if it is a pedestrian detector, the scene is cleared of pedestrians. The training system then assumes that any detections it picks up are false 502 and feeds them into the training to be learned against. This way the training system learns to not detect these things any more. The end result is a new model (e.g., SVM Model) and a set of spatial biases that augment the detection scores.

In operation and as noted above, the visual scene is first cleared 500 of the target object. For example, if that object happens to be people, one makes sure no people are standing in the view of the camera. The Object Detector 401 is run with a base model (trained at the lab) and bias 504 which outputs false detections 502. If requested 507, the spatial bias 506 or feature model 508 is updated. This model and bias pair 510 are then stored 512 and can be used by the Object Detector 401 in the SVM Model (depicted as element 424 in FIG. 4). Then an operator can run the Object Detector 401 in its regular non trained mode. The mode to train or not is set by a simple switch such that it is just turned on or off. This helps to make it simple to use for an end user.

(4.3) Spatial-Based Training

Spatial-based training works by inhibiting regions of incoming images proportionally to a prior erroneous score. Thus, the way to train it is to run the Object Detector to gather false positive scores (if there are any). Then, those scores are subtracted from subsequent scores at the same location. The inhibition can accumulate over successive trainings by either taking the mean of scores or by taking the maximum score. The basic procedure for training a bias is shown in FIG. 6.

Figure 6:
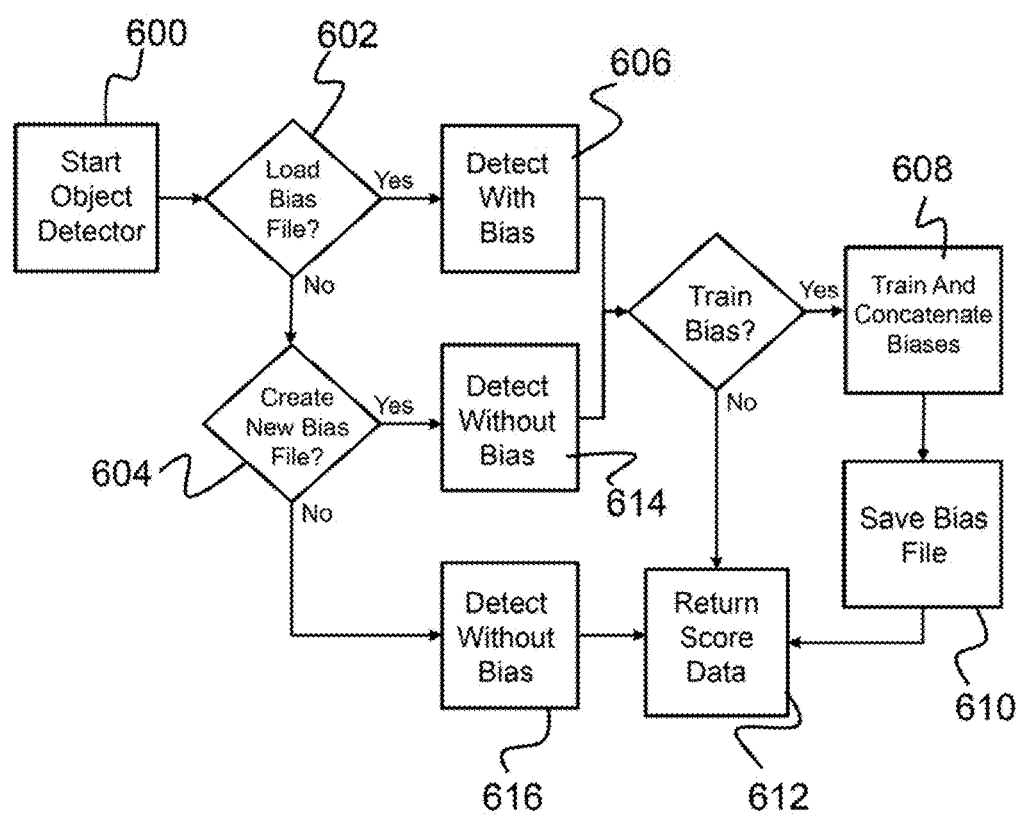
FIG. 6 is a block diagram illustrating a spatial bias procedure according to the principles of the present invention.

FIG. 6 provides a block diagram for the spatial bias procedure. It is trained after the object detection runs. The Object Detector is started 600 and can be loaded with either an existing set 602 of biases which will be augmented, or a brand new set 604 that is created. If an existing set 602 is loaded, the Object Detector detects with the bias 606, which is used to augment the scores during training 608. In training 608, the new and the old bias are combined by concatenating the sets, with the bias file saved 610 and a score 612 is returned. Alternatively, if a new set 604 is created, the Object Detector proceeds without bias 614. Or, the Object Detector can simply be run without creating any new bias files, which also results in the system proceeding without bias 616 to obtain the relevant score data 612. When the Object Detector is run a second time, overlapping biases are addressed.

Recall from FIG. 4 that scores are per rectangular windowed region. Thus, suppression is applied for the region within that window for the score. Thus, rectangles are created with the inverse score as the bias. So, the spatial bias data is a set of rectangles with a bias. Here is an example of a learned bias as it appears in storage:

```
# Nate-o-Matic HRL matrix file.
# Generator: asps-command-line.
# Comment: Uses cv::Rect format (center_x center_y width height) for patch regions
#     For Bias, value of -1.0 completely blocks a region, while 1.0 will always
#     score as an identified object.
# data type (should be float)
# matrix size (columns x rows)
float
5    8
# center_x center_y width height bias
  666.000000    1040.000000    102.000000    204.000000    -0.097233
  454.000000    1380.000000    102.000000    204.000000    -0.286553
  474.000000     882.000000    160.000000    320.000000    -0.298378
 1796.000000     936.000000    102.000000    204.000000    -0.296455
 1488.000000    1006.000000    128.000000    256.000000    -0.320315
 1934.000000     976.000000    102.000000    204.000000    -0.111519
 1006.000000    1370.000000    160.000000    320.000000    -0.492098
 1250.000000     858.000000    160.000000    320.000000    -0.060773
```

Figure 7:
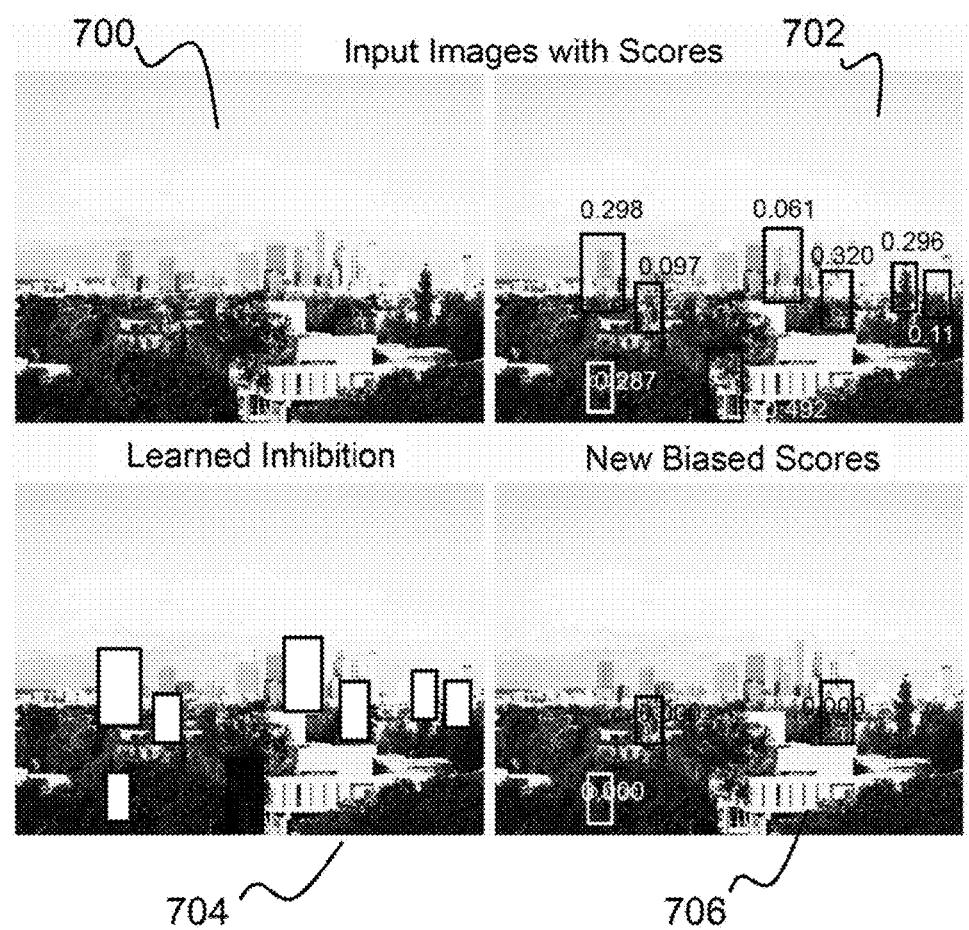
FIG. 7 is an illustration depicting example results using an Object Detector.

What this indicates is that training has produced a set of eight rectangular regions with biases ranging from −0.06 to −0.49. FIG. 7, for example, provides an example visualization of these rectangular regions and their derivation from the scores. This a pathological example (i.e., live scene) from the Object Detector which produces a large number of false positives when looking for people. The top left image 700 is the input image, while the upper right image 702 shows the detector output along with the scores it derives for those detections. The lower left image 704 shows the inhibitory biases learned and the regions those biases are applied to (as white rectangles). The lower right image 706 shows the Object Detector being run again, but now with the biases. All scores are suppressed to near zero.

Figure 8:
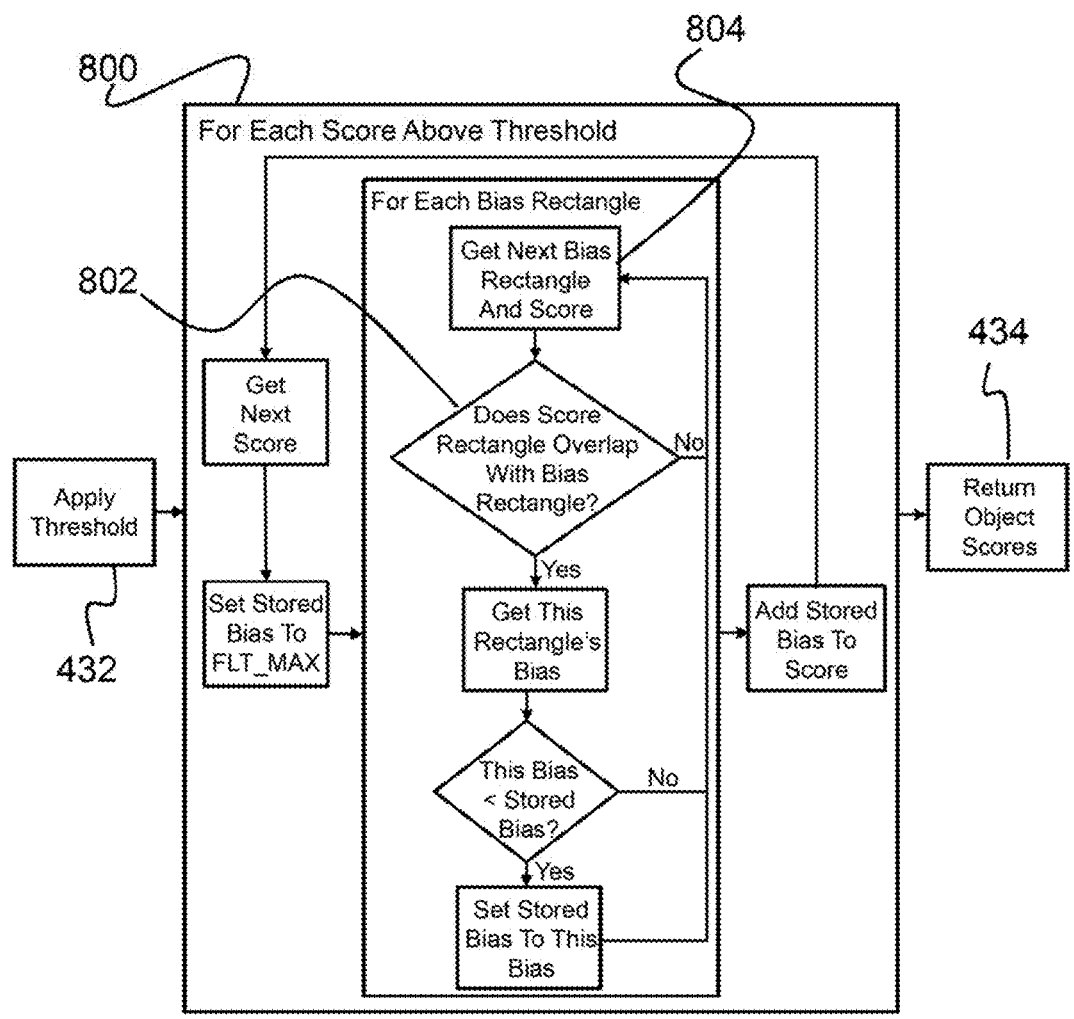
FIG. 8 is block diagram illustrating a process for augmenting object scores with spatial biases according to the principles of the present invention.

Once a set of learned biases are obtained, the Object Detector can be re-run with the biases applied. FIG. 8 provides a block diagram of how the bias scores are applied to augment the object scores 434. The training system applies a threshold 432 and for each score above the threshold, performs a series of spatial bias threshold operations 800 to augment the score and generate the output object score 434. The input is a set of scores which are above the threshold while the output are the object scores 434 augmented by the spatial bias. The threshold 432 is set based on desired recognition and false alarm rates from an example image or dataset that contains the objects. Any value above the threshold 432 will represent an error since the scene being used in this spatial part of the training does not contain the desired object. As a non-limiting example, a typical value for the threshold 432 might be 0.1. Operations are applied above the threshold to eliminate those from consideration since they are errors. During spatial training, the image does not have the object, thus anything above the threshold is an error that needs to be biased against.

For each bias rectangle, the training system proceeds to check if the window rectangle (i.e., score rectangle) overlaps with a bias rectangle. If not, then the next bias rectangle and score 804 are obtained and run through the process. Alternatively, if the window rectangle does overlap with the bias rectangle, then the bias is subtracted. For example, the bias is added to the rectangle score (reducing the score since it is a negative).

If there is more than one bias overlapping on the rectangle, then either the mean or max of the biases may be used. The output of the spatial based training is an augmented score as in Equation 2, where the e component reduces the overall score for the region.

For the case overlapping biases, it is desirable to choose the max bias. FLT_MAX is the maximum representable floating point number used to initialize the bias at the start for each rectangle.

(4.4) Feature-Based Training

Whereas spatial-based training teaches the Object Detector where problems are, feature-based training teaches the Object Detector what they are like (their appearance). The process is similar to spatial-based training in that an operator only needs to ensure that the scene is clear of the target objects before initiating the training system. Then the operator simply clicks train or otherwise activates the training system. Since feature-based training augments its object model, it has the advantage of being able change viewpoint and still work. Spatial-based training loses its validity if the camera is moved from the current location. Feature-based training may be viable for any view within a similar scene. Thus, a camera can be moved to other locations in the same region without having to redo feature-based training. This is because it generalizes the appearance of problem objects.

Figure 9:
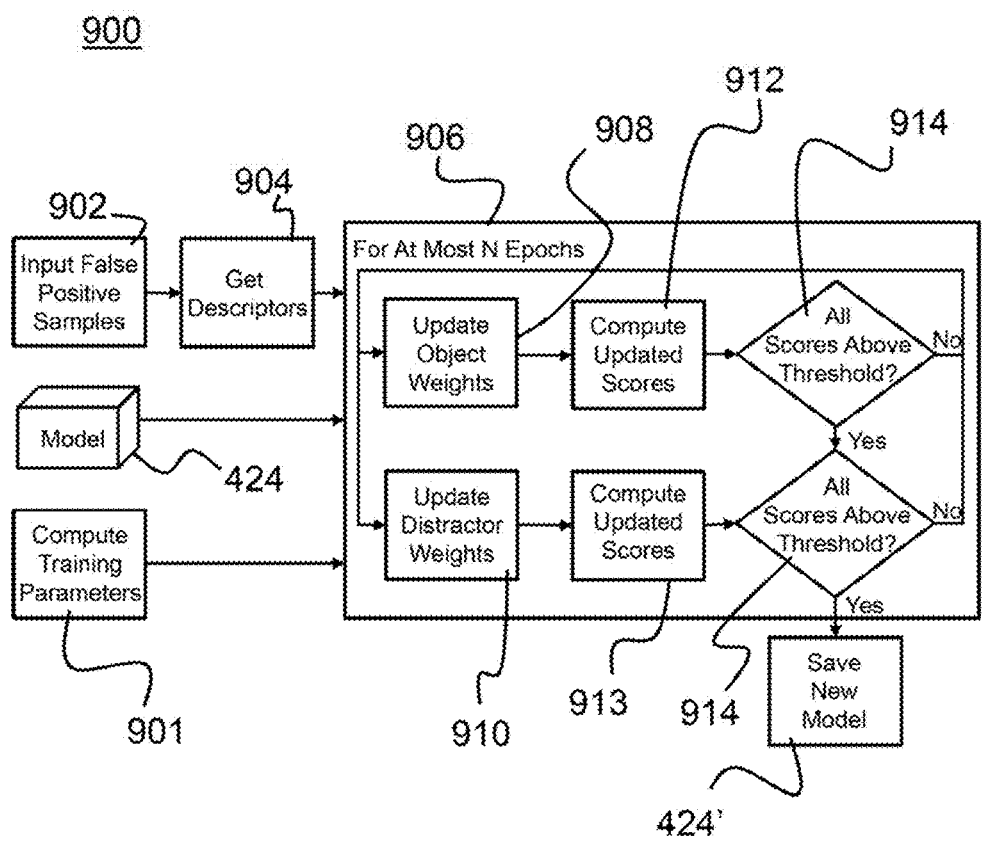
FIG. 9 is a block diagram illustrating a feature-based training process according to the principles of the present invention.

To do feature retraining infield, a general object detection model is utilized which has already been trained prior to the Object Detectors deployment (e.g., trained in the lab). The model is a set of weights which are multiplied by the response of individual features. Recall that this is demonstrated in Equation 1. To augment the weights, the training system implements the procedure as shown in FIG. 9. FIG. 9 is a diagram illustrating the feature-based training process 900. Here, the training system takes the features (i.e., descriptors 904) from all false positive scoring objects 902 and places them in the trainer 906 and augments the weights of the model 424 until it no longer produces a false positive, resulting in a new model 424' for use by the Object Detector (depicted in FIG. 4). However, to prevent over training the number of training epochs is limited to, for example, N<100 epochs. The training system can co-train the component of the model which detects targets at the same time as it augments the component of the model that detects background.

For this process 900 the training system runs each false positive sample through training in a randomized order with particular training parameters 901. Examples of the training parameters 901 are provided below.

Given a sample o, the score is computed for being object 0 (the target object) as:

$$S^0(o)=b^0+\Sigma_{i=1}^n f_i(o) \cdot w_i^0 \qquad (3)$$

Then the score for background (distractor) is computed as:

$$S^1(o)=b^1+\Sigma_{i=1}^n f_i(o) \cdot w_i^1. \qquad (4)$$

If $S^0(o)>0$ or $S^1(o)<0$ then the training system will update the weights. Thus, $S^0(o)>0$ indicates that this is a target object although it is known from having cleared the scene that there can be no target objects. $S^1(o)<0$ indicates that this is not background, which is also known not to be case. Each object weight 908 is then updated as:

$$\hat{w}_i^0 \begin{cases} \text{if } f_i(o) > R & w_i^0 - \eta \cdot f_i(o) \\ \text{else} & w_i^0 \end{cases} \qquad (5)$$

Note that the update is only applied if the feature response is greater than a minimum constant response R. The learning rate ti is less than one and decreases for each epoch, as follows:

$$\eta = \frac{1}{\lambda \cdot t \to 1}, \qquad (6)$$

where t is current training epoch λ is a constant as defined below. This includes the initial epochs from the model 424 before deployment. So if the system spent 1000 epochs to train the initial model, then during infield retraining, t is always greater than 1000. λ is a constant defined as:

$$\lambda = \frac{1}{c \cdot m}, \qquad (7)$$

where C is a constant (currently set equal to 10) and m is the number of training samples in the original set when the model 424 was first trained before deployment. So this is a number like 40,000 (as an example). The background weights are updated 910 similarly as:

$$\hat{w}_i^1 \begin{cases} \text{if } f_i(o) > R & w_i^1 + \eta \cdot f_i(o) \\ \text{else} & w_i^1 \end{cases} \qquad (8)$$

Note that here value is added to the weight rather than being subtracted as it was for the target.

Every 10 epochs (or any other predefined number), a regularizer is applied as follows:

$$\hat{w}_i^0 = w_i^0 \cdot (1-\delta), \qquad (9)$$

and $$\hat{w}_i^1 = w_i^1 \cdot (1-\delta), \qquad (10)$$

where δ is defined as:

$$\delta = \frac{10 \cdot \lambda}{\lambda \cdot t + 1}. \qquad (11)$$

After the weights are updated 908 and 910, the training system computes the updated scores $S^0(o)$ 912 and $S^1(o)$ 913 according to the process above. The process 900 continues until no more samples meet the "If $S^0(o)>0$ or $S^1(o)<0$" requirement (i.e., all scores are above the threshold 914) or the process 900 exceeds the maximum number of epochs. At that point, the new augmented weights are stored back to the model 424' replacing the old weights.

(5) Experimental Results

The training system was implemented with an Object Detector. To demonstrate the effectiveness of the training system, training was performed with high diversity and a large number of input samples. By increasing diversity, the number of weights which will be adjusted during retraining is increased which in turn causes more forgetting of the original training. This also creates more opportunity for cross interference as weights are updated since samples may adjust weights in opposite conflicting directions. For experimental purposes, three pathological cases were selected with large numbers of false positives. The training system was employed with feature-based training, with attention pre-preprocessing turned off to increase the number of false positives. The training images yielded a set of 16 training patches, which is more than twice the typical amount of false positives observed in pathological cases. After training, the images were run through the Object Detector, which demonstrated that 15 of the 16 false positives were eliminated. The last remaining one had its score cut in half. Thus, it is evident that running the training system according to the principles of the present invention dramatically increased the effectiveness of the Object Detector and can be implemented in the field to provide improved results across object detection systems.

What is claimed is:

1. The vision-based object detector, the system comprising:
   one or more processors and a memory, the memory having executable instructions encoded thereon, such that upon execution of the instructions, the one or more processors perform operations of:

running an object detector on an image of a cleared scene to detect objects in the cleared scene, the object detector having a detection classifier with a feature model to generate a detection score for object features and a spatial bias threshold to generate augmented object scores;

designating detected objects in the cleared scene as false detections; and updating at least one of the feature model and spatial bias threshold to designate the false detections as background; and storing the updated feature model or updated spatial bias threshold in the vision based object detector.

2. The vision-based object detector as set forth in claim 1, wherein updating the spatial bias threshold further comprises operations of:

loading an old bias file into the object detector;

combining the old bias file with a new bias file by concatenating the old bias file and the new bias file to generate a learned bias file; and storing the learned bias file.

3. The vision-based object detector as set forth in claim 2, wherein updating the feature model further comprises operations of:

obtaining feature descriptors from all detected objects designated as false detections;

running the feature descriptors through the detection classifier in a randomized order with particular training parameters to generate detection scores;

augmenting weights of the feature model in the detection classifier until all detection scores provided are above a predetermined threshold, indicating no false detections; and saving augmented weights in the detection classifier as the updated feature model.

4. The vision-based object detector as set forth in claim 3, wherein each detection score is associated with a score rectangle in an image of a scene and wherein the learned bias file includes bias rectangles that inhibit false detections of objects within the bias rectangle.

5. The vision-based object detector as set forth in claim 4, further comprising operations of:

determining, for all detection classification scores above a predetermined threshold, if a corresponding score rectangle overlaps with a bias rectangle;

if a score rectangle does not overlap with a bias rectangle, then obtaining a next bias rectangle and score rectangle and determining overlap;

if a score rectangle does overlap with a bias rectangle, then subtracting the bias rectangle from the score rectangle; and generating an augmented object score, the augmented object score reflecting a likelihood that a target object is in the scene.

6. The vision-based object detector as set forth in claim 2, wherein each detection score is associated with a score rectangle in an image of a scene and wherein the learned bias file includes bias rectangles that inhibit false detections of objects within the bias rectangle; and further comprising operations of:

determining, for all detection classification scores above a predetermined threshold, if a corresponding score rectangle overlaps with a bias rectangle;

if a score rectangle does not overlap with a bias rectangle, then obtaining a next bias rectangle and score rectangle and determining overlap;

if a score rectangle does overlap with a bias rectangle, then subtracting the bias rectangle from the score rectangle; and generating an augmented object score, the augmented object score reflecting a likelihood that a target object is in the scene.

7. The vision-based object detector as set forth in claim 1, wherein the detection classifier is support vector machine classifier.

8. The vision-based object detector as set forth in claim 1, wherein updating the feature model further comprises operations of:

obtaining feature descriptors from all detected objects designated as false detections;

running the feature descriptors through the detection classifier in a randomized order with particular training parameters to generate detection scores;

augmenting weights of the feature model in the detection classifier until all detection scores provided are above a predetermined threshold, indicating no false detections; and saving augmented weights in the detection classifier as the updated feature model.

9. A method for training a vision-based object detector, the method comprising an act of:

causing one or more processors to execute instructions encoded on a non-transitory computer-readable medium, such that upon execution, the one or more processors perform operations of:

running an object detector on an image of a cleared scene to detect objects in the cleared scene, the object detector having a detection classifier with a feature model to generate a detection score for object features and a spatial bias threshold to generate augmented object scores;

designating detected objects in the cleared scene as false detections; and updating at least one of the feature model and spatial bias threshold to designate the false detections as background; and storing the updated feature model or updated spatial bias threshold in the vision based object detector.

10. The method as set forth in claim 9, wherein updating the spatial bias threshold further comprises operations of:

loading an old bias file into the object detector;

combining the old bias file with a new bias file by concatenating the old bias file and the new bias file to generate a learned bias file; and storing the learned bias file.

11. The method as set forth in claim 10, wherein updating the feature model further comprises operations of:

obtaining feature descriptors from all detected objects designated as false detections;

running the feature descriptors through the detection classifier in a randomized order with particular training parameters to generate detection scores;

augmenting weights of the feature model in the detection classifier until all detection scores provided are above a predetermined threshold, indicating no false detections; and saving augmented weights in the detection classifier as the updated feature model.

12. The method as set forth in claim 11, wherein each detection score is associated with a score rectangle in an image of a scene and wherein the learned bias file includes bias rectangles that inhibit false detections of objects within the bias rectangle.

13. The method as set forth in claim 12, further comprising operations of:
   determining, for all detection classification scores above a predetermined threshold, if a corresponding score rectangle overlaps with a bias rectangle;
      if a score rectangle does not overlap with a bias rectangle, then obtaining a next bias rectangle and score rectangle and determining overlap;
      if a score rectangle does overlap with a bias rectangle, then subtracting the bias rectangle from the score rectangle; and
   generating an augmented object score, the augmented object score reflecting a likelihood that a target object is in the scene.

14. The method as set forth in claim 10, wherein each detection score is associated with a score rectangle in an image of a scene and wherein the learned bias file includes bias rectangles that inhibit false detections of objects within the bias rectangle; and
   further comprising operations of:
   determining, for all detection classification scores above a predetermined threshold, if a corresponding score rectangle overlaps with a bias rectangle;
      if a score rectangle does not overlap with a bias rectangle, then obtaining a next bias rectangle and score rectangle and determining overlap;
      if a score rectangle does overlap with a bias rectangle, then subtracting the bias rectangle from the score rectangle; and
   generating an augmented object score, the augmented object score reflecting a likelihood that a target object is in the scene.

15. The method as set forth in claim 9, wherein the detection classifier is support vector machine classifier.

16. The method as set forth in claim 9, wherein updating the feature model further comprises operations of:
   obtaining feature descriptors from all detected objects designated as false detections;
   running the feature descriptors through the detection classifier in a randomized order with particular training parameters to generate detection scores;
   augmenting weights of the feature model in the detection classifier until all detection scores provided are above a predetermined threshold, indicating no false detections; and
   saving augmented weights in the detection classifier as the updated feature model.

17. A computer program product for training a vision-based object detector, the computer program product comprising:
   a non-transitory computer-readable medium having executable instructions encoded thereon, such that upon execution of the instructions by one or more processors, the one or more processors perform operations of:
      running an object detector on an image of a cleared scene to detect objects in the cleared scene, the object detector having a detection classifier with a feature model to generate a detection score for object features and a spatial bias threshold to generate augmented object scores;
      designating detected objects in the cleared scene as false detections; and
      updating at least one of the feature model and spatial bias threshold to designate the false detections as background; and
      storing the updated feature model or updated spatial bias threshold in the vision based object detector.

18. The computer program product as set forth in claim 17, wherein updating the spatial bias threshold further comprises operations of:
   loading an old bias file into the object detector;
   combining the old bias file with a new bias file by concatenating the old bias file and the new bias file to generate a learned bias file; and
   storing the learned bias file.

19. The computer program product as set forth in claim 18, wherein updating the feature model further comprises operations of:
   obtaining feature descriptors from all detected objects designated as false detections;
   running the feature descriptors through the detection classifier in a randomized order with particular training parameters to generate detection scores;
   augmenting weights of the feature model in the detection classifier until all detection scores provided are above a predetermined threshold, indicating no false detections; and
   saving augmented weights in the detection classifier as the updated feature model.

20. The computer program product as set forth in claim 19, wherein each detection score is associated with a score rectangle in an image of a scene and wherein the learned bias file includes bias rectangles that inhibit false detections of objects within the bias rectangle.

21. The computer program product as set forth in claim 20, further comprising operations of:
   determining, for all detection classification scores above a predetermined threshold, if a corresponding score rectangle overlaps with a bias rectangle;
      if a score rectangle does not overlap with a bias rectangle, then obtaining a next bias rectangle and score rectangle and determining overlap;
      if a score rectangle does overlap with a bias rectangle, then subtracting the bias rectangle from the score rectangle; and
   generating an augmented object score, the augmented object score reflecting a likelihood that a target object is in the scene.

22. The computer program product as set forth in claim 18, wherein each detection score is associated with a score rectangle in an image of a scene and wherein the learned bias file includes bias rectangles that inhibit false detections of objects within the bias rectangle; and
   further comprising operations of:
   determining, for all detection classification scores above a predetermined threshold, if a corresponding score rectangle overlaps with a bias rectangle;
      if a score rectangle does not overlap with a bias rectangle, then obtaining a next bias rectangle and score rectangle and determining overlap;
      if a score rectangle does overlap with a bias rectangle, then subtracting the bias rectangle from the score rectangle; and
   generating an augmented object score, the augmented object score reflecting a likelihood that a target object is in the scene.

23. The computer program product as set forth in claim 17, wherein the detection classifier is support vector machine classifier.

24. The computer program product as set forth in claim 17, wherein updating the feature model further comprises operations of:

obtaining feature descriptors from all detected objects designated as false detections;

running the feature descriptors through the detection classifier in a randomized order with particular training parameters to generate detection scores;

augmenting weights of the feature model in the detection classifier until all detection scores provided are above a predetermined threshold, indicating no false detections; and saving augmented weights in the detection classifier as the updated feature model.

25. The vision-based object detector as set forth in claim 1, wherein running an object detector further comprises:

using a feature model, generating a detection score for object features; and using a spatial bias threshold, generating augmented object scores.

\* \* \* \* \*